United States Patent [19]

Miley et al.

[11] Patent Number: 5,614,724

[45] Date of Patent: Mar. 25, 1997

[54] FILTER TYPE GAS SAMPLER WITH FILTER CONSOLIDATION

[76] Inventors: Harry S. Miley, 219 Rockwood Dr., Richland; Robert C. Thompson, 5313 Phoebe La., West Richland; Charles W. Hubbard, 1900 Stevens, Apt. 526; Richard W. Perkins, 1413 Sunset, both of Richland, all of Wash. 99352

[21] Appl. No.: 570,068

[22] Filed: Dec. 11, 1995

[51] Int. Cl.$^6$ ..................................................... G01T 7/04
[52] U.S. Cl. ........................ 250/435; 250/304; 250/432 R
[58] Field of Search ................................ 250/435, 432 R, 250/304; 378/47

[56] References Cited

U.S. PATENT DOCUMENTS 4,277,682  7/1981  Madelaine et al. ...................... 250/435
5,225,673  7/1993  Pressianov et al. ...................... 250/435

FOREIGN PATENT DOCUMENTS 144769  8/1983  Japan ...................................... 250/304

*Primary Examiner*—Carolyn E. Fields

[57] ABSTRACT

Disclosed is an apparatus for automatically consolidating a filter or, more specifically, an apparatus for drawing a volume of gas through a plurality of sections of a filter, whereafter the sections are subsequently combined for the purpose of simultaneously interrogating the sections to detect the presence of a contaminant.

12 Claims, 4 Drawing Sheets

5,614,724

FILTER TYPE GAS SAMPLER WITH FILTER CONSOLIDATION

This invention was made with Government, support under Contract DE-AC06-76RLO 1830 awarded by the U.S. Department of Energy. The Government has certain rights in the invention.

FIELD OF THE INVENTION

The present invention relates generally to an apparatus for automatically consolidating a filter or, more specifically, to an apparatus for drawing a volume of gas through a plurality of sections of a filter, whereafter the sections are subsequently combined for the purpose of simultaneously interrogating the sections and detecting the presence of a contaminant.

BACKGROUND OF THE INVENTION

The desire for identifying and quantifying the constituents of contaminants in gases has generated a wide variety of detection means for testing various gases. The particular method or apparatus employed for determining the contaminants present in a given gas is often determined by the availability or condition of the particular sample which is to be interrogated. For example, concern about the release of hazardous substances into the environment, specifically the earth's atmosphere, has created a need for apparatus or methods for detecting for the presence of such hazardous substances as contaminants in a sample of air from the atmosphere.

A variety of apparatus or methods are known in the art for testing to determine whether the atmosphere contains contaminants. These apparatus and methods can be used to confirm or refute a suspected release of a given hazardous substance or contaminant. One example of such apparatus or methodology for testing air samples from the atmosphere begins with drawing a volume of atmospheric air through a filter, typically constructed of paper. After a predetermined volume of air has passed through the filter, the filter may then be interrogated by a wide variety of means to determine the presence of a contaminant. A variety of tradeoffs are apparent in the design of apparatus for the use of filters in air sampling. For example, a particular filter has a specific permeability per unit of surface area to a particular gas, such as air, at a certain pressure drop across the filter. Testing for very small amounts or trace contaminants generally requires a large volume of air to be passed through the filter to collect a detectable amount of contaminant for interrogation. Thus, to pass a sufficient volume of gas through a section of the particular filter requires a sufficient surface area of the filter, a sufficient pressure drop across the filter, and sufficient time to allow the required volume of gas to pass through the filter. A reduction in any of these variables requires a corresponding increase in one of the others to capture the same amount of contaminant on the filter.

If, for example, power available for use by the detection apparatus is limited, a smaller pump is necessary which will decrease the pressure drop across the filter. To collect contaminant samples under such conditions, which are identical to the contaminant samples collected with a larger pump, will thus require either a longer period of time for sample collection, or a larger cross section of filter paper, or some combination of the two. Restrictions of other operating parameters may force similar tradeoffs between the variables including the type of filter utilized, the surface area of the filter through which the gas is passed, the pressure drop across the filter, and the time allowed for the required volume of gas to pass through the filter.

The particular interrogation means utilized will be dependent upon the particular contaminant of interest. For example, interrogating a filter for contaminant radionuclides may be accomplished with a germanium detector or a sodium iodide detector. Interrogating a filter for non-radioactive inorganic contaminants may be accomplished with an x-ray fluorescence detector.

The effectiveness or accuracy of such interrogation methods is dependent upon the physical proximity of the detection means to the contaminant to be detected. For example, the sensitivity of a germanium detector interrogating a sample for the presence of radionuclides is inversely proportional to the distance between the radionuclide and the germanium detector. Also, should a particular sample contain a very small amount of the contaminant of interest spread across the surface area of the filter, the effectiveness and accuracy of many such interrogation methods may require that the entire mass of a contaminant sample be interrogated simultaneously. For both of these reasons, it is often advantageous to consolidate or minimize the surface area of the filter prior to interrogation and to cause the entire surface area of the filter to be interrogated simultaneously by insuring that the entire surface area of the filter is in close proximity to the detection means.

Minimization of the surface area of the filter for effective interrogation conflicts with maximization of the surface area of the filter for contaminant collection. Those skilled in the art have overcome these seemingly contradictory goals by using large surface area filters during sample collection and then subsequently manually folding the filter over on itself, or manually packing the filter into a small volume, prior to interrogation. Prior to the present invention, there has been no effective method known in the art for automatically consolidating the filter for interrogation.

Thus, there exists a need among those skilled in the art for an apparatus which automatically consolidates a filter utilized in a gas sampling apparatus prior to interrogation.

SUMMARY OF THE INVENTION

The present invention is an apparatus for passing a sample of a gas through a plurality of filters which are then automatically combined for interrogation.

It is an object of the invention that a large surface area of filter be available for collecting contaminants from gas samples allowing rapid sample collection and interrogation despite the use of either a filter having low permeability, or a low power pump generating a low pressure drop across said filter, or both.

It is a further object of the invention that the large surface area of filter, which is available for contaminant collection, be made of a plurality of sections of filter. In this manner, the plurality of sections of filter permits maximum passage of gas through the total filter surface area during sampling. The sections of filter are then placed adjacent to one another during interrogation such that the surface area of each of the sections of filter overlaps the other sections, allowing simultaneous interrogation of all of the sections of filter, and reducing the distance between the filters and the detection means.

As will be apparent to those skilled in the art, this technique is equally effective for collecting contaminants from any gas sample, and is not limited to air samples.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DESCRIPTION OF THE PREFERRED EMBODIMENT(S)

Figure 1:
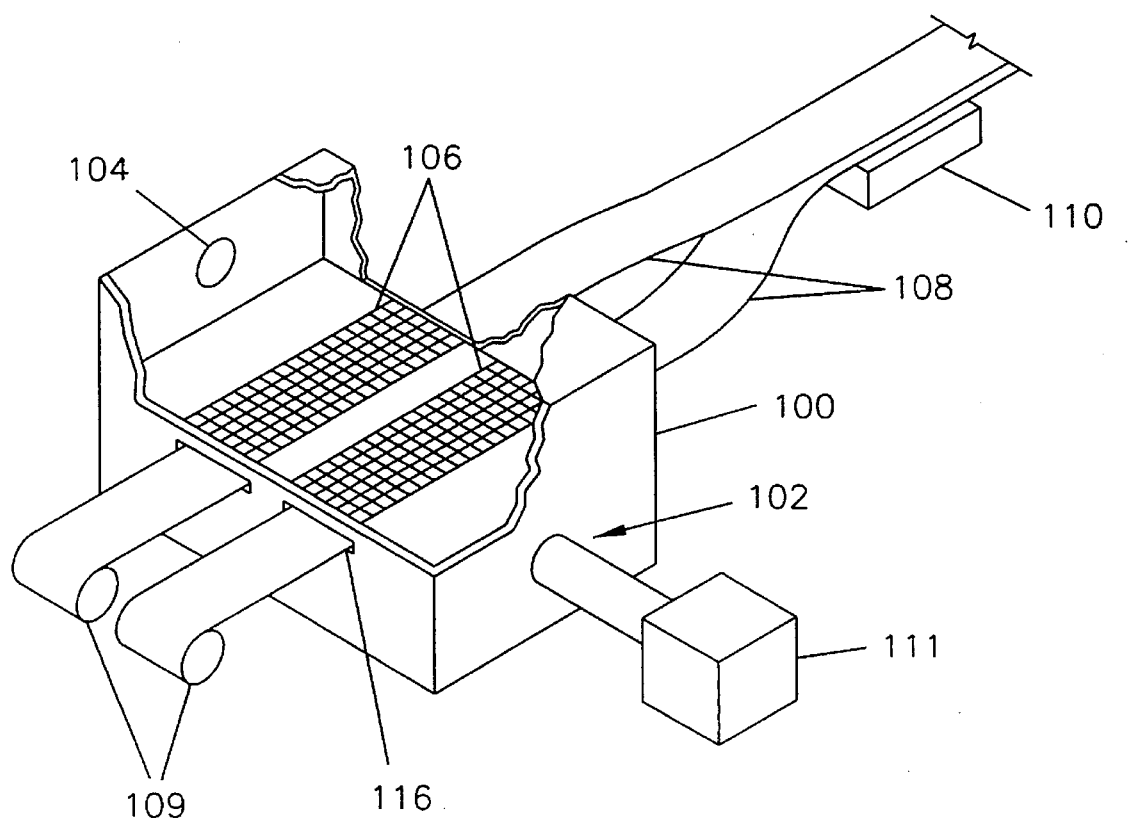
FIG. 1 is a view of the present invention showing the arrangement of the blower, the plurality of filters, and the detector.

The present invention is an apparatus for collecting a contaminant from a gas passed through a plurality of filters 108. As illustrated in FIG. 1, a collection housing 100 having a gas inlet 102 and a gas outlet 104 is provided. A plurality of permeable filter supports 106 are placed between the gas inlet 102 and the gas outlet 104. Each section 108 is placed adjacent to each permeable filter support 106. A gas, such as air, may then be forced into the gas inlet 102 with a blower 111. Gas forced into the gas inlet 102 then passes through the filters 108 and the permeable filter supports 106 such that substantially all of the gas passes through the filters 108. A sample of the contaminant contained within the gas is thereby collected on the filters 108. A permeable filter support 106 may be any configuration which will support the filters 108 and allow the passage of gas through the filters 108, including, but not limited to, a screen or a slotted member. The filter 108 may be of any type; however, filter 108 constructed of paper and arranged with each filter 108 having one end coiled in a dispensable roll 109 is preferred. The dispensable rolls 109 may be on the interior or exterior of the collection housing 100; if the dispensable rolls 109 are located on the exterior of the housing as shown in FIG. 1, each filter 108 must pass through a slot 116 in the collection housing 100.

After sample collection, the filters 108 may be advanced from the permeable filter supports 106. The filters 108 may then be made to overlap one and another such that the locations on each of the filters 108 where the sample of the contaminant was collected are aligned with one and another. The overlapping sections 108 may then be interrogated with a detector 110. The overlapping sections of filter 108 may then be made to continue from the detector 110 where they may be stored, archived or disposed. The filters 108 may be made to overlap and/or be interrogated on the interior or exterior of the collection housing 100.

A pressure differential is created across each filter 108 by the blower 111 which may be any well known means for moving a gas such as air, including but not limited to an electrical fan pump or blower, or a mechanical fan pump or blower. The blower 111 can be configured to either push gas into the gas inlet 102 as shown in FIG. 1, or pull gas out of the gas outlet 104, as long as the blower 111 creates a pressure differential sufficient to cause a gas sample to pass through the filters 108. After a predetermined amount of gas is allowed to pass through the filters 108, the filters 108 are advanced and made to overlap one another. The filters 108 are then positioned adjacent to a detector 110 where the overlapping filters 108 may be interrogated simultaneously. The detector 110 may be any detector 110 known in the art including, but not limited to, a germanium detector, a sodium iodide detector, a cadmium telluride detector, a cadmium zinc telluride detector, a bismuth germanate detector, plastic and liquid scintillators, or an x-ray fluorescense detector. The specific detector 110 selected will be determined by the specific contaminant of interest which the user desires to detect.

EXAMPLES

Figure 2:
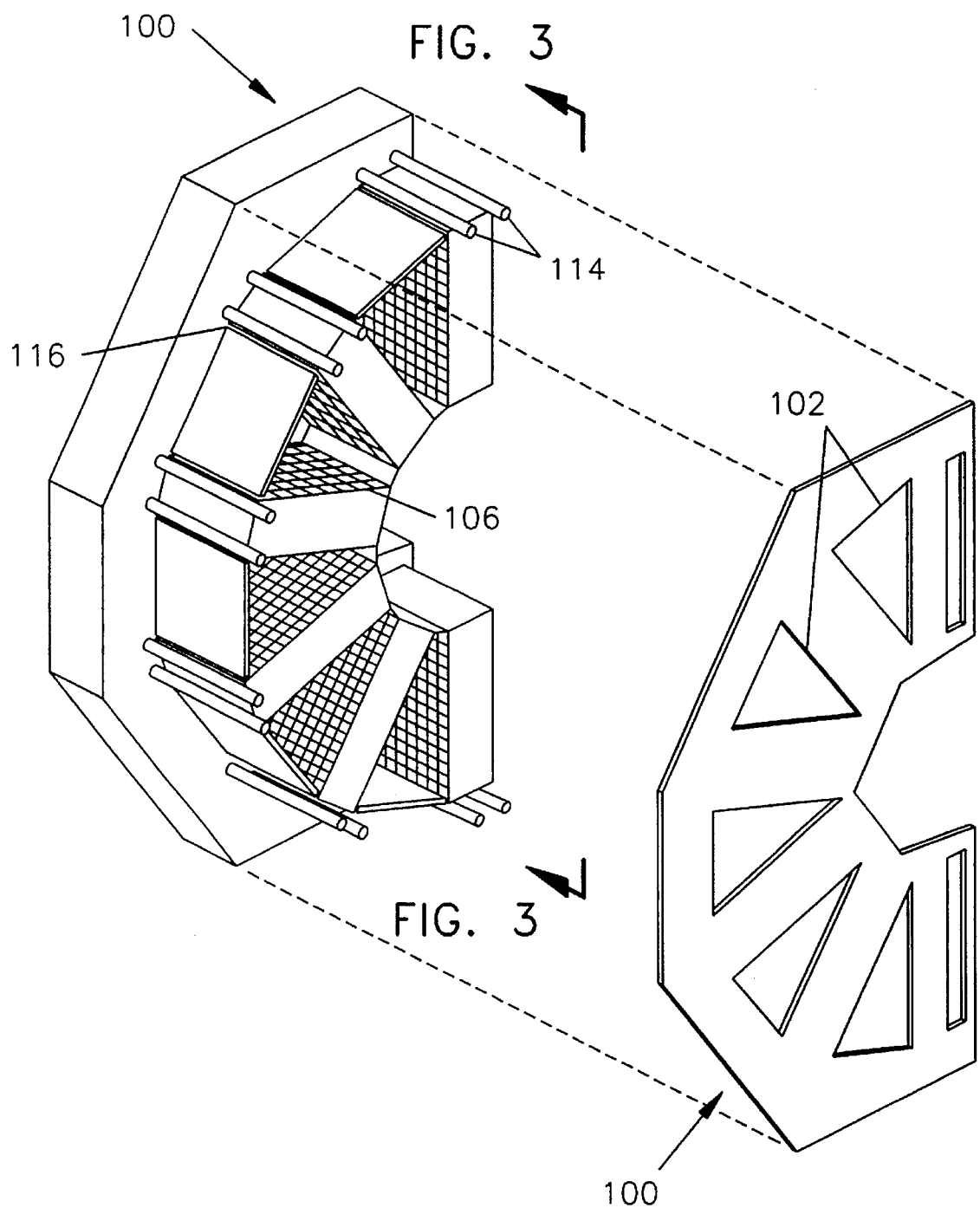
FIG. 2 is a view of a preferred embodiment of the present invention showing the arrangement a plurality of filter supports.
Figure 3:
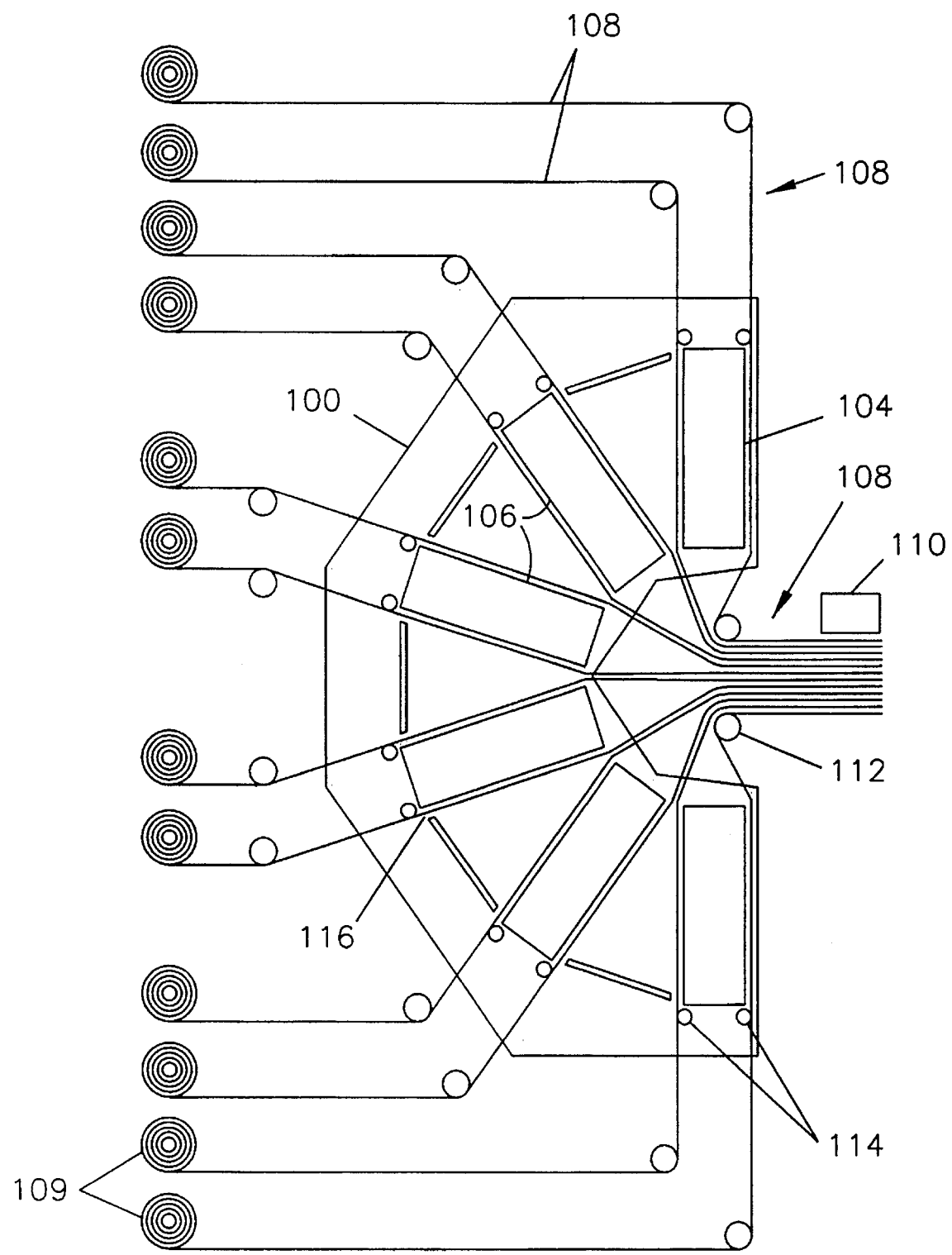
FIG. 3 is a schematic view of a preferred embodiment of the present invention showing the arrangement a plurality of filters and a detector.

As illustrated in FIGS. 2 and 3, a working prototype of the present invention was built and tested. Twelve sections of filter paper 108, each 5" wide, were guided by guide wires (not shown) and rollers 114 to and over permeable filter supports 106 measuring 4" by 8", which applicant provided as screens in the working prototype. Thus, air samples were drawn through sections of each filter 108 measuring 4" by 8". This produced a combined surface area of 384 sq. inches available for sampling, which was then reduced to a surface area of 16 sq. inches when the filters 108 were made to overlap for interrogation. The prototype utilized an electric fan 111 operating at 1 hp to force gas through the filters 108. The prototype utilized a germanium detector 110 manufactured by the Canberra Company of Meridian Conn., USA.

The prototype was tested utilizing SBMF filter paper manufactured by the 3M Corporation of Minneapolis Minn. Each interrogation required a period of 24 hours, wherein a total of about 38,000 cubic yards of air was passed though the twelve sections of filter 108. The filters 108 were then advanced through two rollers 112 wherein the filters 108 were overlapped, and then interrogated to determine whether the air contained certain radio-nuclides. The prototype was operated continuously for several months, producing one interrogated sample per day.

Figure 4A:
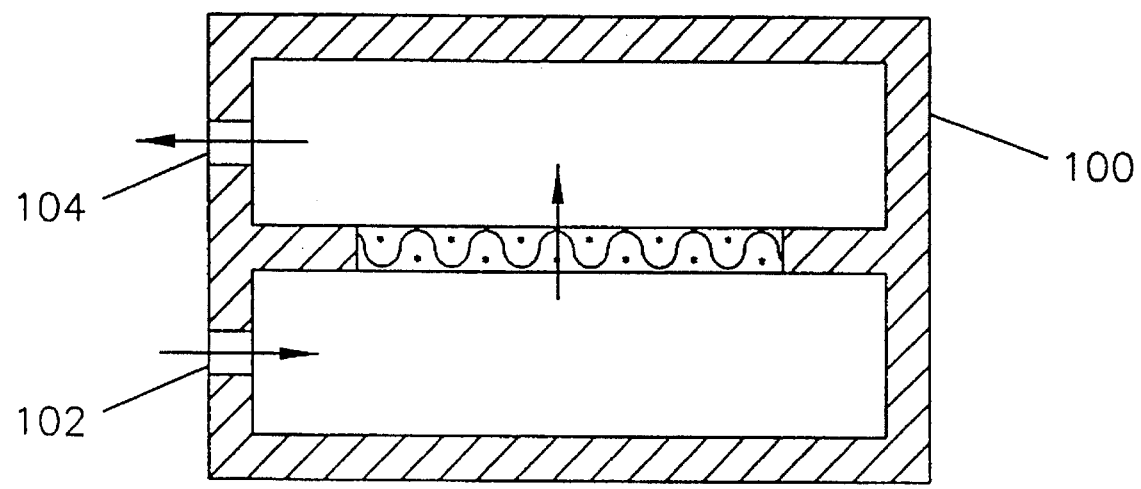
FIG. 4a is a view of the present invention showing the inlet and outlet oriented on the same side of the collection housing.
Figure 4B:
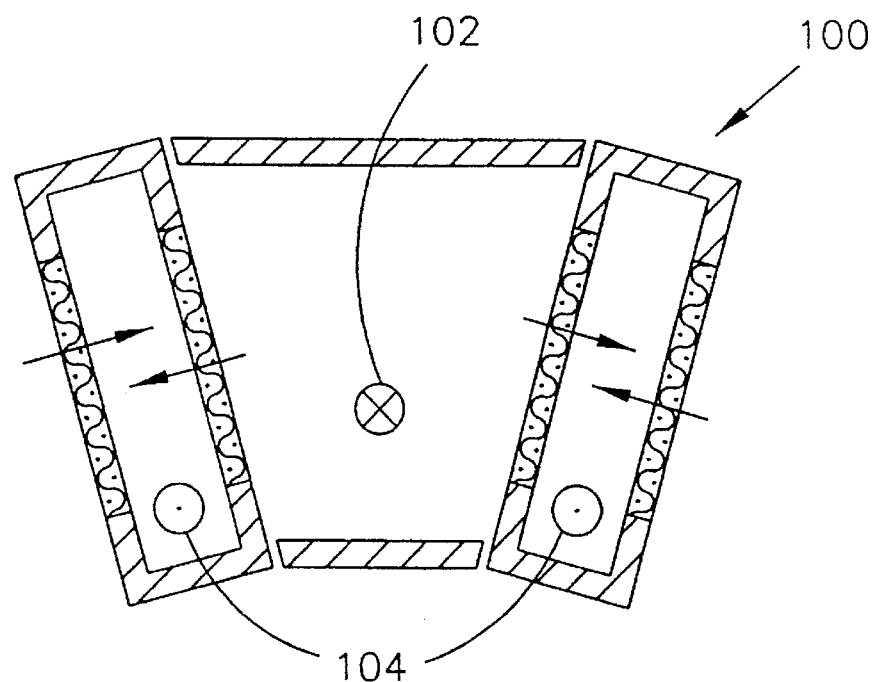
FIG. 4b is a view of the present invention showing the inlet and outlet oriented on opposite sides of the collection housing.

In FIG. 1, the filters 108 pass over permeable filter supports 106 that are coplanar, whereas in FIG. 2 the permeable filter supports 106 (screens) are radial. It will be apparent to those of skill in the art of filter supports that there are many relative orientations of the permeable filter supports 106 possible. The inlet 102 and outlet 104 may be on the same side of the collection housing 100 as indicated in FIG. 4a, or the inlet 102 and outlet 104 may be on opposite sides of the collection housing 100 as indicated in FIG. 4b. In FIG. 4b, the circle with an "x" indicates flow direction into the plane of the paper, and the circle with the dot indicates flow direction out of the plane of the paper. It will be apparent to those skilled in the art of directing gas flow through a filter that the inlet(s) 102 and outlet(s) 104 may be located in any position on the collection housing 100.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. An apparatus for collecting a sample contaminant from a gas passed through a filter and for detecting said contaminant comprising:
   a) a collection housing having a gas inlet and a gas outlet,
   b) a plurality of permeable filter supports placed between said gas inlet and said gas outlet,
   c) a plurality of sections of filter, each placed adjacent to and corresponding with each of said plurality of permeable filter supports, such that substantially all of said gas passes through said plurality of sections,
   d) a blower for moving the gas into said gas inlet, through said plurality of sections at locations that collect said contaminant, and out of said gas outlet, and
   e) a detector for simultaneously interrogating said plurality of sections.

2. The apparatus of claim 1, wherein the detector is selected from the group consisting of a germanium detector, a sodium iodide detector, a cadmium telluride detector, a cadmium zinc telluride detector, a bismuth germanate detector, a plastic scintillator, a liquid scintillator.

3. The apparatus of claim 1, wherein the permeable filter support is selected from the group consisting of a screen and a slotted member.

4. The apparatus of claim 1, wherein slots are provided in the collection housing for passage of said sections.

5. The apparatus of claim 1, wherein the permeable filter supports are coplanar.

6. The apparatus of claim 1, wherein the permeable filter supports are arranged radially.

7. A method for collecting a sample contaminant from a gas passed through a filter and for detecting said contaminant comprising the steps of:
   a) providing a collection housing having a gas inlet and a gas outlet,
   b) providing a plurality of permeable filter supports placed between said gas inlet and said gas outlet,
   c) providing a plurality of sections of filter, each placed adjacent to and corresponding with each of said plurality of permeable filter supports, such that substantially all of said gas passes through said plurality of sections,
   d) moving the gas into said gas inlet, through said plurality of sections and collecting said sample contaminant, and moving said gas out of said gas outlet,
   e) providing a detector for simultaneously interrogating said plurality of sections.

8. The method of claim 7, wherein the detector provided is selected from the group consisting of a germanium detector, a sodium iodide detector, a cadmium telluride detector, a cadmium zinc telluride detector, a bismuth germanate detector, a plastic scintillator, a liquid scintillator.

9. The method of claim 7, wherein the permeable filter support is provided as selected from the group consisting of a screen and a slotted member.

10. The method of claim 7, wherein slots are provided in the collection housing for passage of said sections.

11. The method of claim 7, wherein the permeable filter supports are provided as coplanar.

12. The method of claim 7, wherein the permeable filter supports are provided as arranged radially.

* * * * *

UNITED STATES PATENT AND TRADEMARK OFFICE
CERTIFICATE OF CORRECTION

PATENT NO. : 5,614,724
DATED : 03/25/97
INVENTOR(S) : Harry S. Miley, Robert C. Thompson, Charles W. Hubbard, Richard W. Perkins It is certified that error appears in the above-identified patent and that said Letters Patent is hereby corrected as shown below:

On the title page, below item [76], add item [73] Assignee: Battelle Memorial Institute, Richland, Wash.--.

On the title page, below "Primary Examiner", please add --Attorney, Agent, or Firm - Douglas McKinnley--.

Signed and Sealed this

Nineteenth Day of January, 1999

Attest:

Attesting Officer

Acting Commissioner of Patents and Trademarks